United States Patent [19]
Lisker

[11] Patent Number: 5,293,859
[45] Date of Patent: Mar. 15, 1994

[54] GRILL WITH FUEL MODULES

[76] Inventor: Mikhail Lisker, 201 W. End Ave., Brooklyn, N.Y. 11235

[21] Appl. No.: 833,295

[22] Filed: Feb. 10, 1992

[51] Int. Cl.$^5$ .............................................. A47J 37/07
[52] U.S. Cl. .................................... 126/26; 126/9 R;
126/25 A; 44/519; 44/530; 44/541; 99/449
[58] Field of Search ................... 126/9 R, 9 A, 25 R,
126/25 A, 29, 26; 44/519, 530, 541; 99/449

[56] References Cited

U.S. PATENT DOCUMENTS

| | | | |
|---|---|---|---|
| 1,212,162 | 1/1917 | Green | 126/9 R |
| 2,414,490 | 1/1947 | Speaker | 126/9 A |
| 2,965,096 | 12/1960 | Barton | 126/25 R |
| 2,998,814 | 9/1961 | Forsberg | 126/25 A |
| 3,101,080 | 8/1963 | Lorbacher | 126/25 |
| 3,191,591 | 6/1965 | Bennett | 126/25 R |
| 3,194,429 | 7/1965 | Bouet . | |
| 3,266,478 | 8/1966 | Booth | 126/25 R |
| 3,385,282 | 5/1968 | Lloyd | 126/25 R |
| 3,682,154 | 8/1972 | Mollere | 126/9 A |
| 3,692,013 | 9/1972 | Grafton et al. | 126/25 R |
| 3,765,397 | 10/1973 | Henderson | 126/25 R |
| 4,210,118 | 7/1980 | Davis et al. | 126/25 R |
| 4,254,863 | 3/1981 | Kates et al. . | |
| 4,413,609 | 11/1983 | Tisdale | 126/25 R |
| 4,508,094 | 4/1985 | Hait | 126/9 R |
| 4,526,158 | 7/1985 | Lee | 126/9 R |
| 4,531,506 | 7/1985 | Chambers et al. | 126/25 R |
| 4,535,748 | 8/1985 | Hunerwadel | 126/25 R |
| 4,819,614 | 4/1989 | Hitch | 126/25 R |
| 4,938,202 | 7/1990 | Hait | 126/9 R |

FOREIGN PATENT DOCUMENTS 2439805  3/1976  Fed. Rep. of Germany ..... 126/9 A Primary Examiner—Harvey C. Hornsby
Assistant Examiner—Mark Spisich

[57] ABSTRACT

A grill, which may be portable, includes an open support lattice surrounded by upright walls. The support lattice forms a plurality of adjoining bays each dimensioned to receive and support a fuel module in the form of a disposable non-flammable tray and charcoal briquettes within the tray. Various food supporting devices may be used to support items of food to be cooked on the upper edges of the walls or at selected lower levels by use of terraced steps cut out in the walls. By placing fuel modules in less than all the bays, both the size and the shape of the cooking area can be selected. When no fuel modules are used a flat plate can be placed on top of the support lattice on which conventional briquettes can be placed.

14 Claims, 7 Drawing Sheets

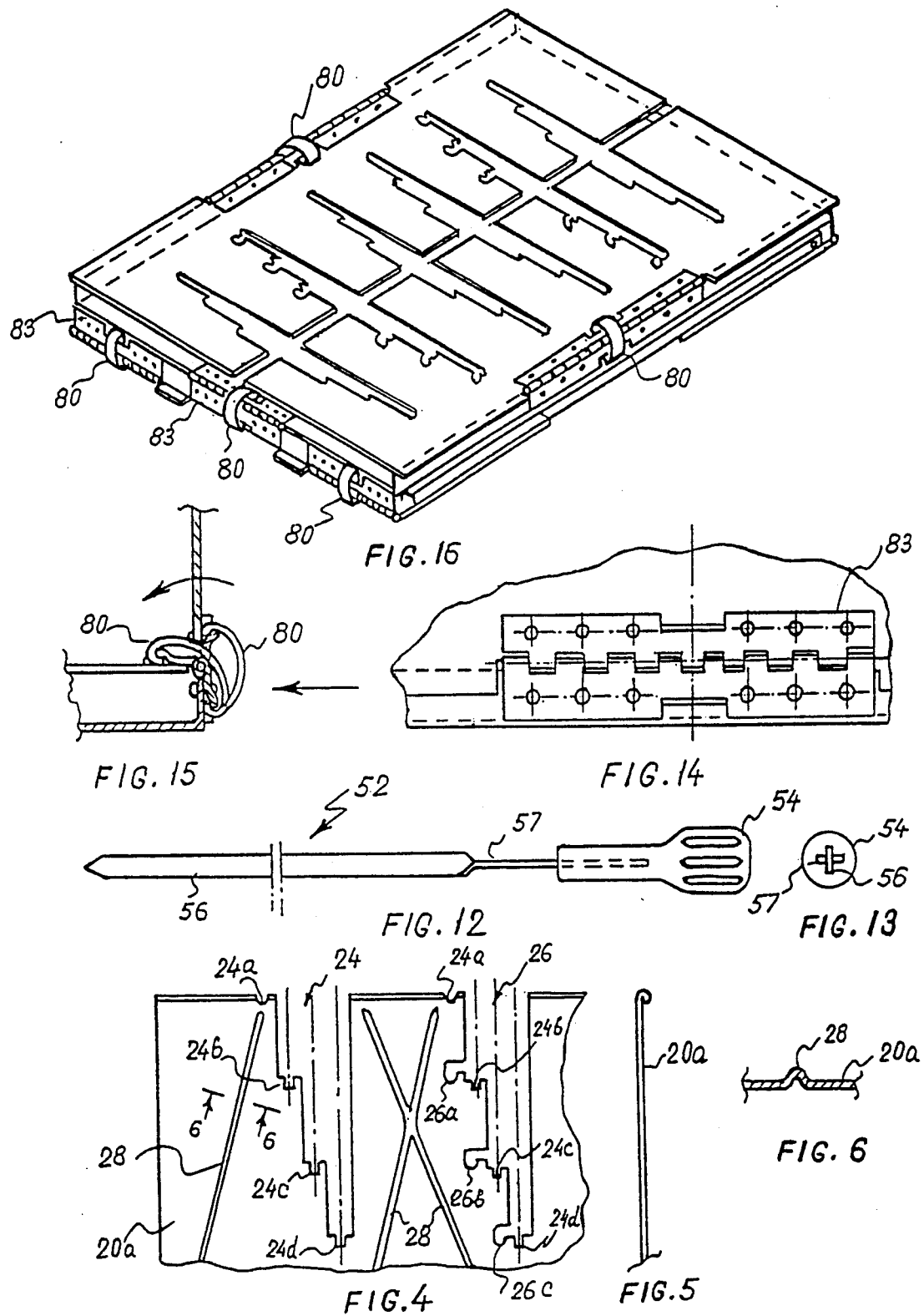

5,293,859

GRILL WITH FUEL MODULES

BACKGROUND OF THE INVENTION

Portable cooking or barbecue grills have conventionally been fueled with charcoal briquettes. Such briquettes are typically sold in different sized bags and users have placed such briquettes onto a charcoal grate or other charcoal supporting surface. This approach has presented some problems. Firstly, it has necessitated the user also to bring to the barbecue site a frequently heavy bag of charcoal briquettes. Aside from the inconvenience and possible spillage of charcoal briquettes or dust, the use of loose charcoals does not always result in controlled dispensing of a proper amount of briquettes. This, in turn, may result in heat which is too high or too low and, in most cases, uneven heat over the cooking area. Samples of some portable cooking grills which fall in this category include those disclosed in U.S. Pat. Nos. 4,508,094 and 4,938,202, both to Hait, 4,526,158 to Lee, 3,765,397 to Henderson and 4,413,609 to Tisdale. A collapsible barbeque cooking store of this type is shown in U.S. Pat. No. 4,210,118 to David et al.

When too many briquettes are poured on the grate, either some briquettes have to be removed or the resulting pile may be too high and uneven heating results. The tendency, therefore, is to spread the briquettes over the entire area of the grate. This frequently provides heat in areas which are not needed and the briquettes are thereby inefficiently used and wasted. In U.S. Pat. No. 3,101,080 to Lorbacher an outdoor grill is disclosed which includes a free-standing partition which can be used to compact the fuel toward one end of the box, as in later stages of burning, or where a small capacity cooking job is contemplated. The partition makes it possible to contain the fuel within areas of the grill which may be varied along the length of the grill. However, movement of the partition during later stages of burning may be difficult because the partition becomes heated. Additionally, movement of burning briquettes frequently releases ash or dust which deposits on the food being cooked. Furthermore, the degree of containment will, as with the previously described embodiments, be a function of the quantity of briquettes initially deposited.

In U.S. Pat. No. 3,194,429 to Bouet a cooking device is disclosed which includes a rigid carrier frame with a handle and a cooking container which is flame resistant and disposable. The device is intended to be placed over a flame or briquettes exteriorly.

In U.S. Pat. No. 4,254,863 to Katcs et al. a barbecue pack is disclosed which is intended to be used once or twice and then disposed. The barbecue pack includes a fuel pack which may be ignited by igniting paper packets which form part of the fuel pack and which contain charcoaled lumps. The grill, however, is primarily intended to be disposed to avoid cleaning. Also, the fuel pack is generally the size of the barbecue pack, cardboard box and wire frame into which the fuel pack is received. There is no possibility to selectively provide a large cooking surface, when that is needed, or to provide a small cooking surface when that is more appropriate.

In U.S. Pat. No. 3,682,154 to Mollere, a portable disposable charcoal grill is disclosed in which charcoal briquettes are placed over a fire pan and covered by a grill. A fuel or briquette element is disclosed which consists of either one piece or an integral grid of briquette segments which require no starting fluid. The patent identifies a number of known or available "self-starting" fuel elements although, it appears that the size of the fuel element or fuel pack always corresponds to the total available cooking area or surface presented by the grill.

SUMMARY OF THE INVENTION

Accordingly, it is an object of the present invention to provide a portable grill which is not possessed of the disadvantages inherent in the prior art portable grills.

It is another object of the present invention to provide a portable grill which is simple in construction and economical to manufacture.

It is still another object of the present invention to provide a portable grill of the type under discussion which is convenient to use and easy to clean.

It is yet another object of the present invention to provide a grill of the type under discussion which can present differently sized or shaped cooking areas by selectively accepting one or more fuel modules.

It is a further object of the present invention to provide a portable grill as in the previous objects which can be used with one or more fuel modules or which can be converted for use with conventional charcoal briquettes.

It is yet another object of the present invention to provide a portable grill as suggested in the previous objects which is transportable.

In order to achieve the above objects, as well as others which will become apparent hereafter, a grill in accordance with the present invention is primarily for use with fuel modules having predetermined planar configurations and dimensions. The grill comprises a support lattice defining a plurality of adjoining bays each dimensioned to receive and support a fuel module and defining a peripheral edge extending about all said bays. Side walls are provided extending about said periphery of said support lattice, the region above said lattice defining a cooking or grilling area. Food supporting means is provided which is supported on said side walls for maintaining an item of food to be grilled above said lattice and within said cooking or grilling area. In this manner, selected regions of said cooking areas can be heated by selectively placing fuel modules in corresponding bays below said areas.

In accordance with one aspect of the invention, the grill is in combination with at least one fuel module. The fuel module comprises a disposable non-inflammable tray and charcoal briquettes within said tray. A sheet of flammable material is used for covering said tray and retaining said charcoal briquettes therein prior to use.

BRIEF DESCRIPTION OF THE DRAWINGS

The above and other objects are attained by the invention, preferred embodiments of which will be described in the specification as follows, taken in conjunction with the drawings, in which:

FIG. 4 is a fragmented side elevational view of a wall of the grill shown in FIG. 1, showing the reinforcements to the wall as well as multiple step openings for receiving various food supporting devices of the type suggested in FIG. 1;

FIG. 5 is a side elevational view of the wall shown in FIG. 4;

FIG. 6 is a cross-sectional view of the side wall shown in FIG. 5, taken along line 6—6;

FIG. 12 is a top elevational view of a modified skewer for use with the grill shown in FIG. 1;

FIG. 13 is an end view of the skewer shown in FIG. 12;

FIG. 14 is an elevational view of a hinge used to fold the walls of the grill into a collapsed condition;

FIG. 15 is an end view of the hinge shown in FIG. 14;

FIG. 16 illustrates the grill being folded into a suitcase configuration having an internal space for storing and for transport of various of the cooking elements or utensils;

DESCRIPTION OF THE PREFERRED EMBODIMENTS

Figure 1:
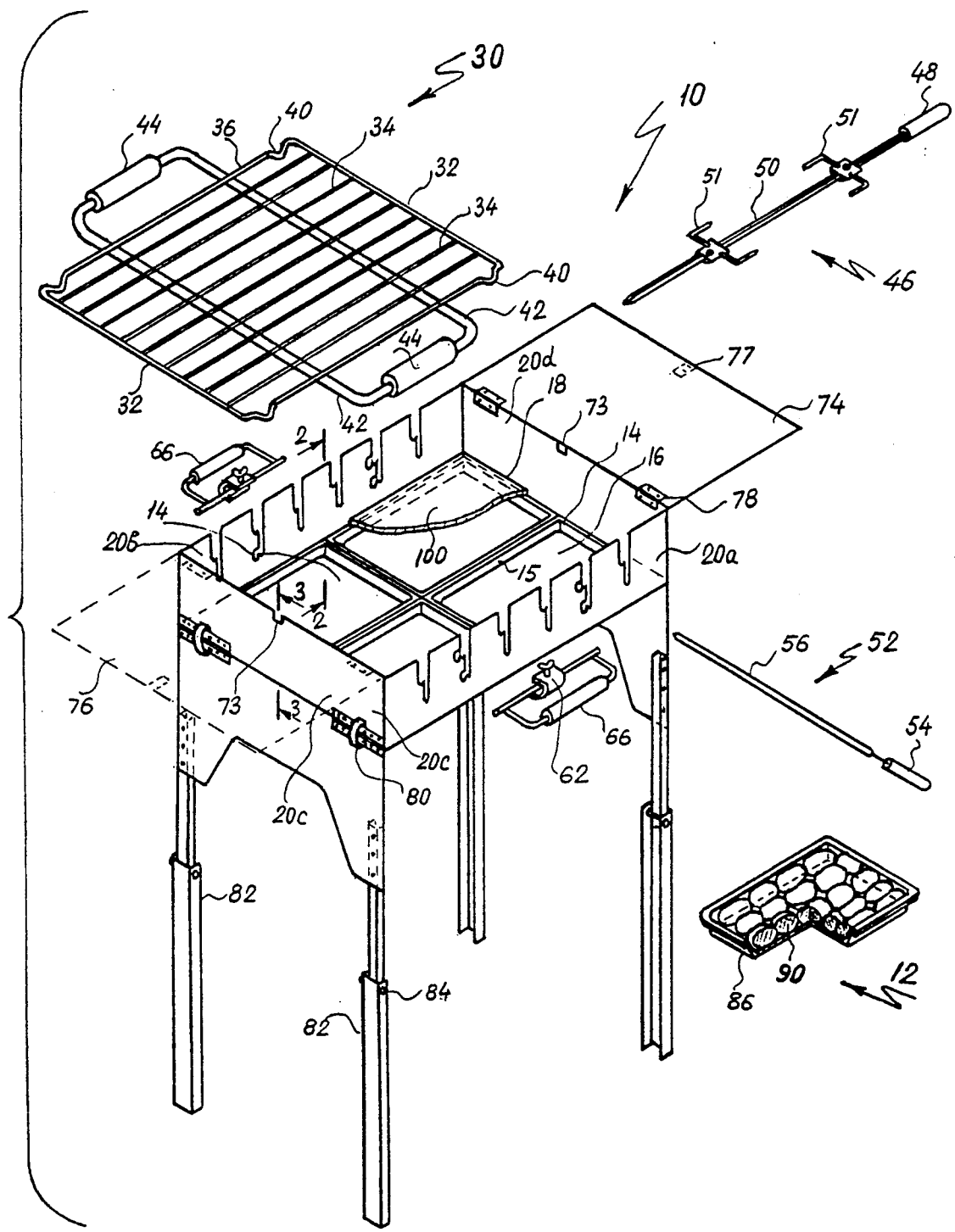
FIG. 1 is a perspective view of a grill in accordance with the present invention, shown partially exploded to illustrate the various accessories or elements that can be used with the grill and showing the grill fully extended ready for use.

Referring now specifically to the figures, in which identical or similar parts are designated by the same reference numerals throughout and first referring to FIG. 1, a grill in accordance with the present invention is generally designated by the reference numeral 10.

The grill 10 is primarily for use with fuel modules 12, to be more fully described in connection with FIGS. 18-21. In FIG. 1, the fuel module 12 has predetermined planar configuration and dimensions. Thus, the fuel module 12 is shown to be generally rectangular and having given width, length and thickness dimensions.

An important feature of the invention is the provision of a support lattice generally designated by the reference numeral 14 which defines a plurality of adjoining bays 16. Normally, all of the bays are the same size, although this is not critical. However, in order to use a single size fuel module, all of the bays 16 are advantageously identically dimensioned in order to receive and support a fuel module 12, as will be more fully described in connection with FIGS. 2 and 3.

Figure 2:
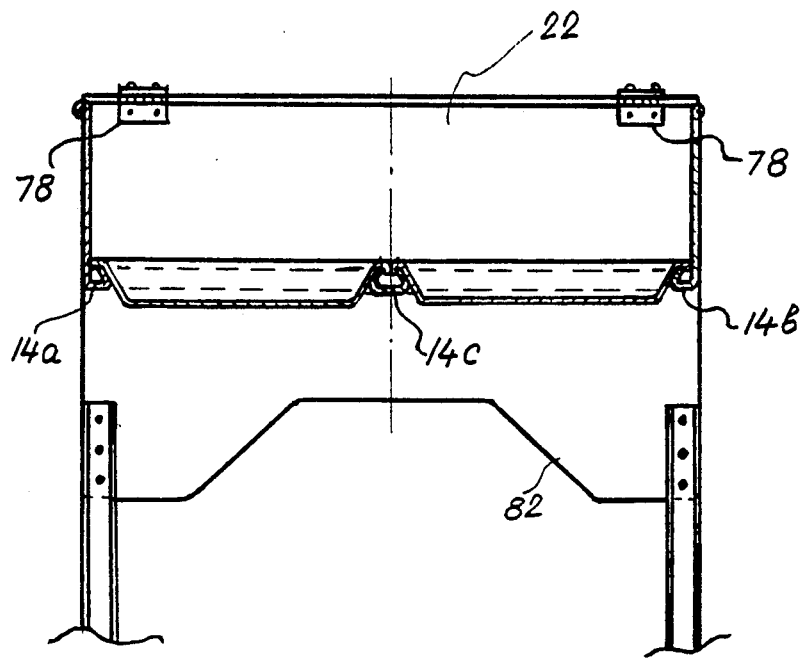
FIG. 2 is a cross-sectional view of the grill shown in FIG. 1, taken along line 2—2.
Figure 3:
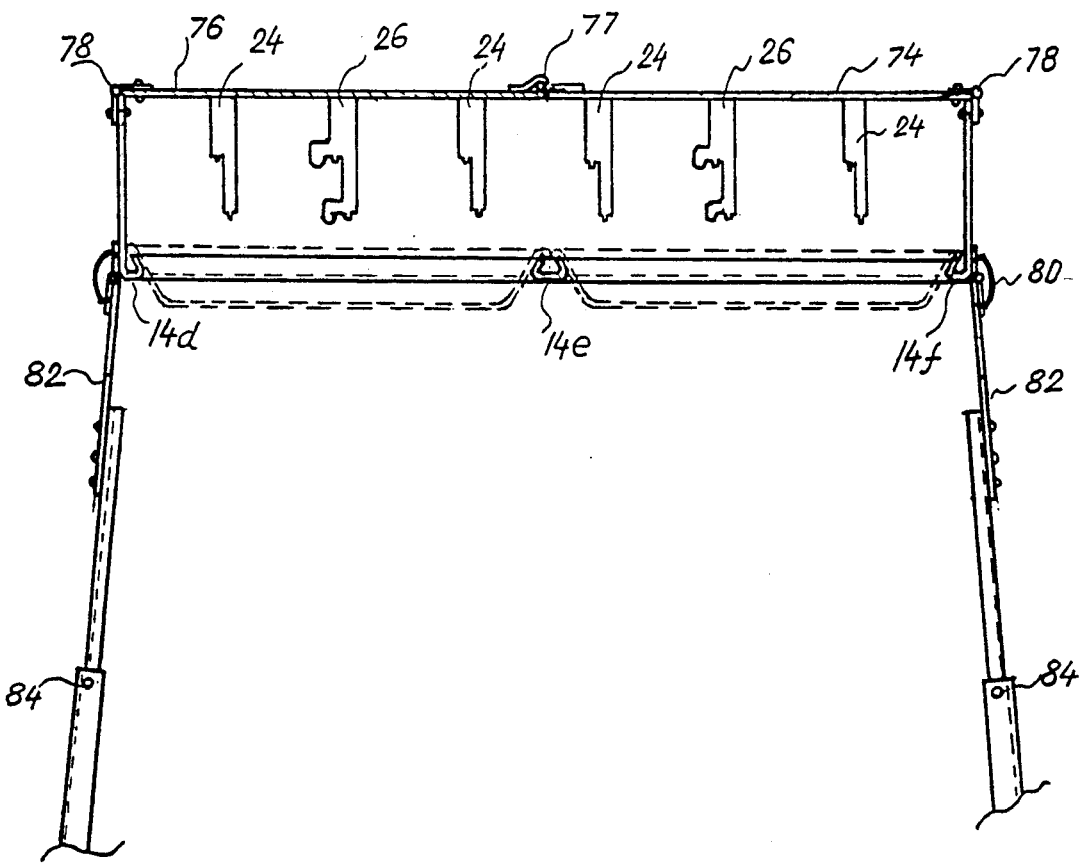
FIG. 3 is a cross-sectional view of the grill shown in FIG. 1, taken along line 3—3.

The support lattice 14 has a peripheral edge 18 which extends about all of the bays 16. A series of walls are provided which extend about the periphery 18, including front and rear walls 20a, 20b and lateral walls 20c and 20d. The region above the support lattice 14 defines a cooking or grilling area 22 (FIGS. 2 and 3).

Numerous food supporting devices can be used in conjunction with the present invention. Many of such food supporting devices are disclosed in U.S. Pat. No. 5,105,726, the disclosure of which is incorporated herein. As disclosed in the aforementioned patent, front and rear walls 20a, 20b can be provided with a series of stepped cut-outs 24, 26 (FIGS. 1 and 3). Steps 24a–24d (FIG. 4) provide successively lower levels for supporting a skewer or the like closer to the source of heat, namely the fuel modules 12 supported in the bays 16. Openings 26, in addition to the same steps 24a–24d, are also provided with inwardly directed steps 26a–26c. Stamped ribs 28, shown in FIGS. 4 and 6, reinforce the walls in which the cut-outs 24, 26 are provided.

One example of a food supporting device is a grill 30 which includes lateral rods 32 and transverse rods 34 which extend between the rods 32. The end transverse rods 36 connect the rods 32 and include at the ends thereof downwardly extending indentations 40, which serve as legs for placing the grill on a level or flat surface. Central rods 42 extend below and are connected to the rods 34, 36 and are provided, at the ends thereof, with handles 44. The rods 42 are spaced a distance which corresponds to the distance between two cut-outs 26 which are adapted to receive and to support the grill 30 in any one of the positions shown in FIG. 4.

While the grill 30 is supported on the front and rear walls 20a, 20b, a skewer 46 having a handle 48 and a rod 50 having a generally square cross-section can be used between the walls 20c and 20d. Of course, the skewer 46 can also be placed across the front and rear walls 20a, 20b and received and locked within slots 73 in the walls 20a, 20b. Conventional holders 51 may be placed on the rod 50 for securing an item to be broiled, such as poultry.

Smaller skewers 52 (FIGS. 1, 12 and 13) a handle 54 and blade, may be used for items such as shish-ke-bob. This skewer includes a flat blade which is twisted at some point 90 degrees so as to produce two portions 56, 57 which are mutually orthogonal to each other. A handle 54 is mounted on the portion 57. Such a skewer, also described in the aforementioned U.S. Pat. No. 5,105,726, may be used in conjunction with slots 24a–24d (FIG. 4) in the walls 20a, 20b which are dimensioned to receive the blades 56, 57 with small clearance. In this manner, the skewer 52 may be rotated 90 degrees at a time and secured in place by inserting one or the other of the portions 56, 57 in one of the slots 24a–24d so as to maintain the position thereof.

Figure 10:
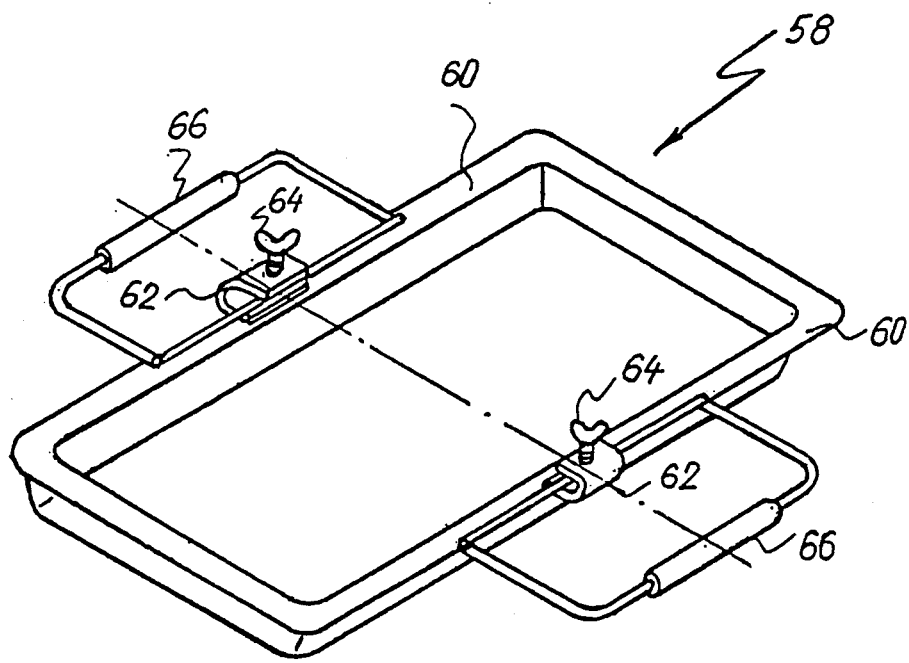
FIG. 10 is a perspective view of a cooking pan that can be used with the grill shown in FIG. 1.
Figure 11:
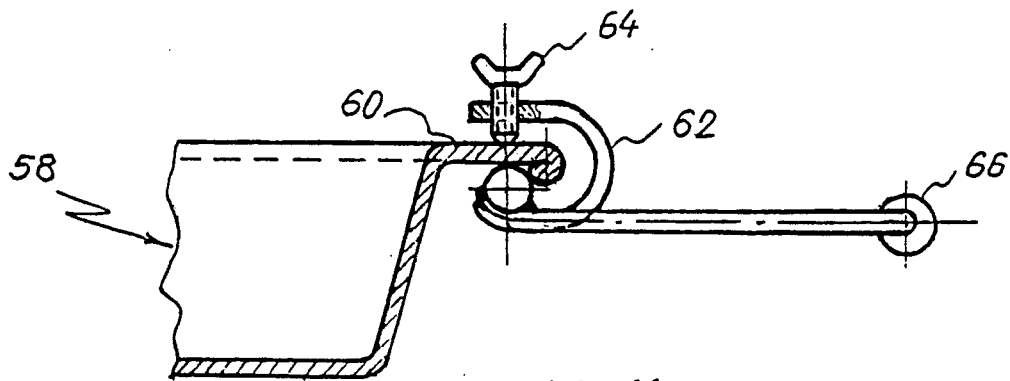
FIG. 11 is an enlarged cross-sectional view of one wall of the plate shown in FIG. 10, showing the manner in which handles can be attached to the peripheral flange extending around the pan.
Figure 7:
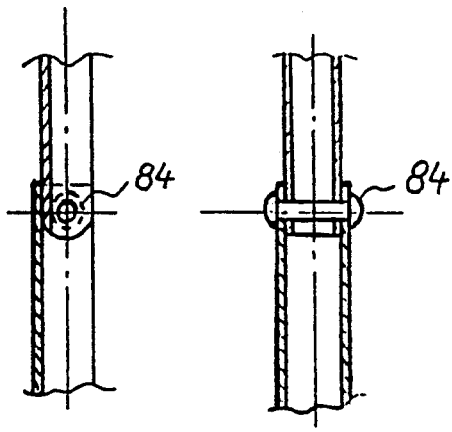
FIG. 7 is an enlarged view, partially in cross-section, of one of the collapsible legs shown in FIG. 1.
Figure 8:
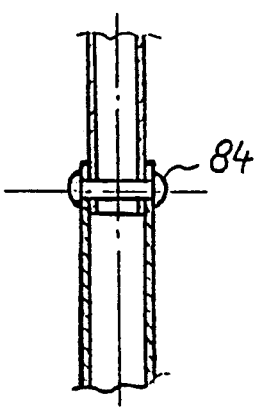
FIG. 8 is a front elevational view of the collapsible leg shown in FIG. 7.

Referring to FIGS. 10 and 11, the barbecue grill 10 may also be used for warming or cooking items of food. In this connection, a deep dish 58 may be provided which has a peripheral rim 60 dimensioned to correspond to the cooking or grilling area 22, so that the ledge or rim 60 can be supported on the upper edges of the walls 20a-20d. Since such dish can become hot, handles may be provided, as shown in FIGS. 1, 10 and 11 which includes a clamp 64 for clamping a handle 66 to the dish so that it can be lifted or raised off of the grill.

It will be understood, however, that the specific food supporting device is not critical for purposes of the present invention.

Figure 9:
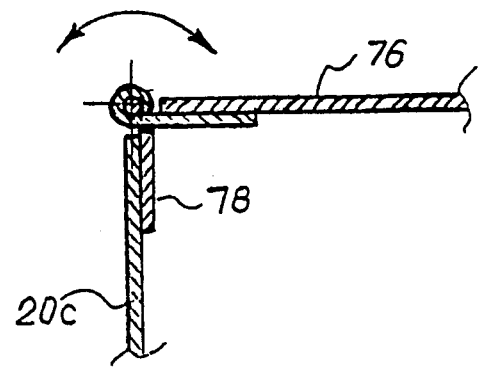
FIG. 9 is a cross-sectional view, taken along line 9—9 in FIG. 1.

Optional covering doors 74, 76 may be provided for closing the cooking or grilling area 22 when the grill is not in use about hinges 78 to provide a substantially closed enclosure as shown in FIG. 16 in which grilling accessories or food supporting devices of the type aforementioned may be stored and transported. The details of the hinges 78 are shown in FIG. 9.

The grill 10 is preferably provided with legs 82 which can be connected to the upper part of the grill in any conventional manner. Preferably, the legs 82 telescope or are hinged or pivotable about pins 84, so that the legs can be shortened to a size which makes it practical to fold the legs together with the remainder of the grill so as to obtain one compact package. The legs 82 may also be hingedly connected to the support lattice 14 about its periphery by means of hinges 83, the details of which are shown in FIGS. 14 and 15. When cover 74, 76 are not provided, the grill can collapse to a condition shown in FIG. 16. In this case, the accessories and food supporting devices must be separately carried and stored. Springs 80 maintain the legs either in the extended position shown in FIG. 3 or the folded position shown in FIG. 16.

Figure 17:
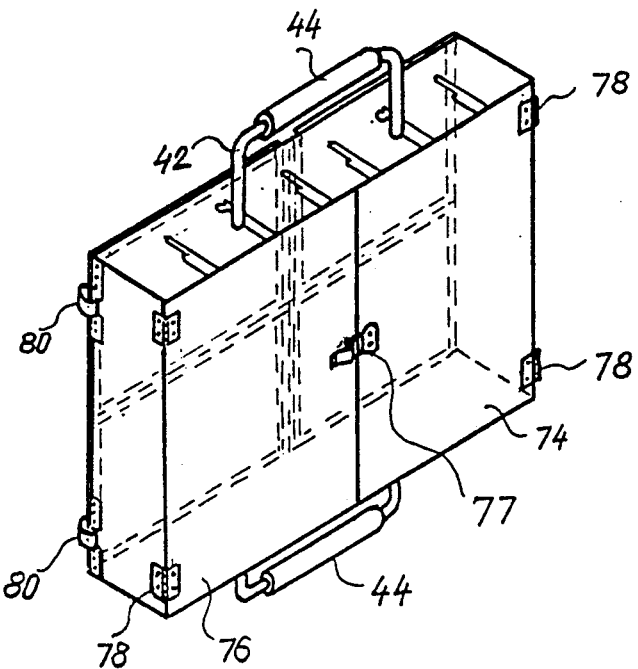
FIG. 17 illustrates another embodiment wherein the grill is fully collapsed and in condition for storage or transportation.

In FIGS. 15, 17 an alternative embodiment is shown in which the walls 20a–20d are also pivotably mounted in relation to the support lattice 14 to fold up into a more compact form which cannot, however, store or transport various accessories. Springs 80 (FIG. 15) serve a similar purpose as for the legs 82.

As best shown in FIGS. 3 and 16, a lock 77 is advantageously provided which maintains the covers 74, 76 in closed condition.

Figure 21:
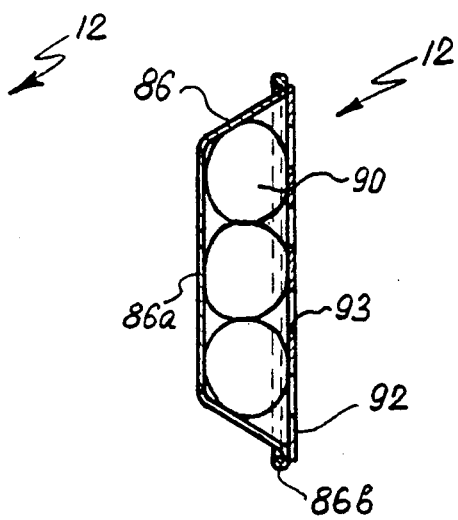
FIG. 21 is an end elevational view, taken in cross-section of the fuel module shown in FIG. 19.

Referring to FIGS. 18-21, fuel modules in accordance with the present invention generally consists of a disposable non-inflammable tray 86. Such a tray may be made of aluminum. Charcoal briquettes 90 are provided within the tray, and a sheet of generally flammable covering material 92 is provided for covering the tray and retaining the charcoal briquettes prior to use. The sheet of material 92 may, for example, be cardboard or paper. As shown in FIG. 21, the covering sheet material 92 may be provided with apertures 93 to allow air to flow into the interior of the fuel module thereby facilitating the ignition or kindling of the fuel module.

Figure 18:
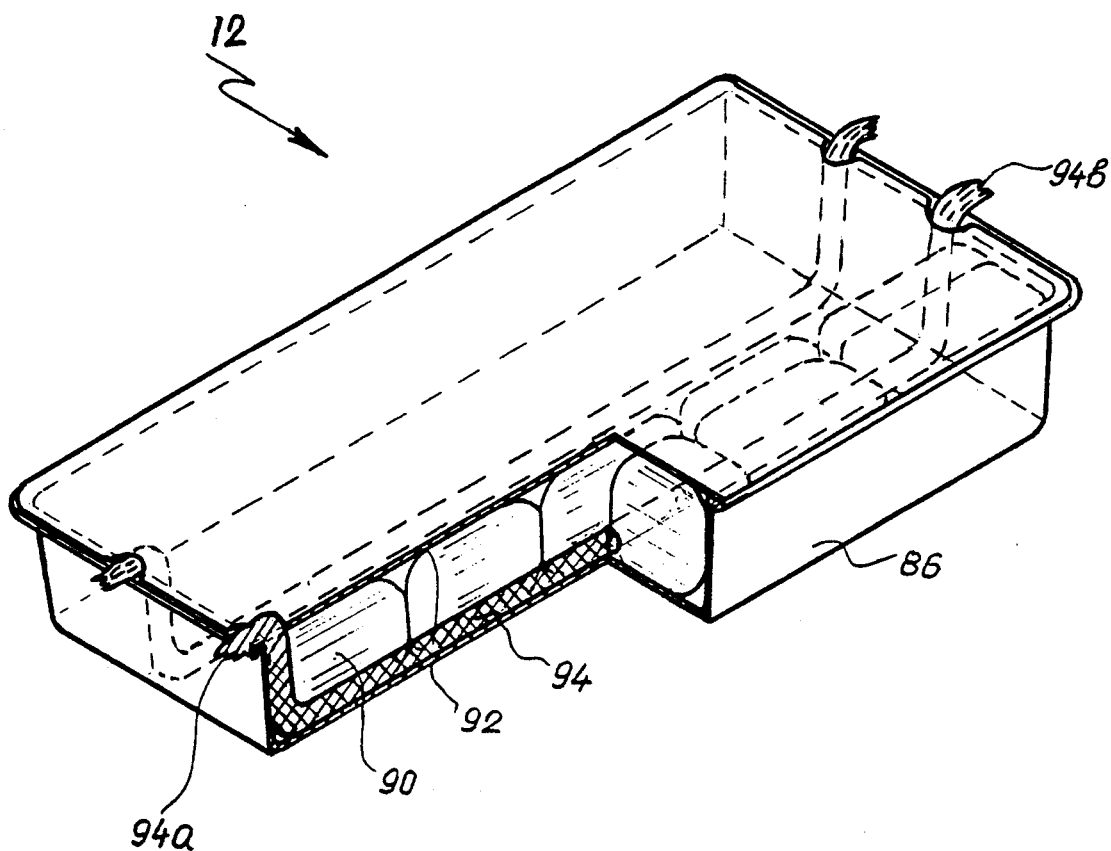
FIG. 18 is an enlarged view of a food module in accordance with the present invention, partially broken away to illustrate the internal construction.

In accordance with one construction of the fuel module, where the briquettes are not "instant lighting", briquette lighting means is provided which includes at least one flammable wick 94 which is in contact with at least some of the charcoal briquettes 90 within the tray 86 and has at least one free end 94a which extends out of and is accessible outside of the tray for lighting. In FIG. 18, both free ends 94a, 94b are exposed and may be ignited. The wick 94 may also be any flammable material which can be ignited and preferably burns slowly so as to ignite the charcoal briquettes. A cord or wick saturated with oil may serve this purpose. Where the briquettes are "instant lighting", the cord or wick 94 may be omitted.

Figure 22:
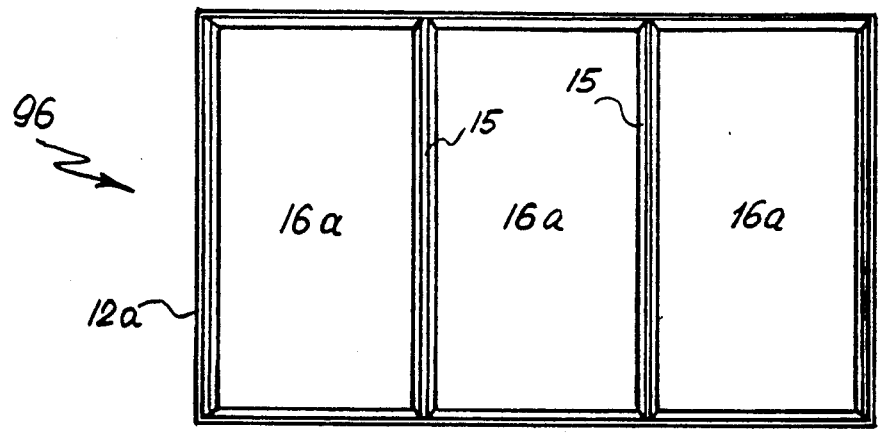
FIG. 22 illustrates a variant configuration of the support lattice shown in FIG. 1.
Figure 23:
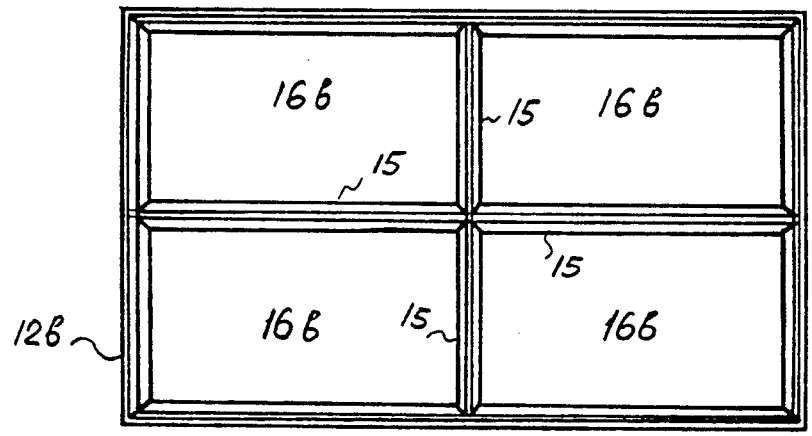
FIG. 23 is similar to FIG. 22, but showing a different configuration of the lattice.
Figure 24:
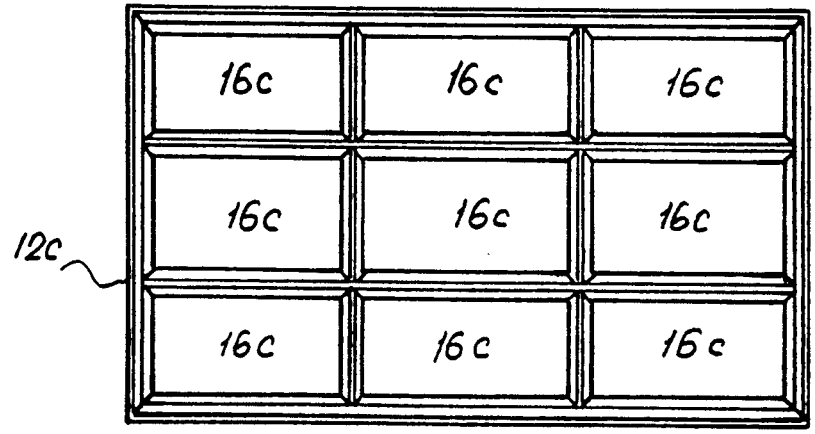
FIG. 24 is similar to FIGS. 22 and 23, but showing still another variant of the support lattice.

As will be appreciated, the support lattice 14 can assume any shape. In the preferred embodiment, it is shown to be rectangular. Referring to FIG. 22, the cooking area is divided into three adjoining rectangular areas 16a. In FIG. 23, four equally sized bays 16b are provided to cover the same area, while nine equally sized bays 16c are provided in FIG. 24. In each case, the bays are formed by a plurality of support members 15 which, in the case of FIGS. 23 and 24, may be mutually orthogonal and intercepting each other as shown. Thus, in FIG. 22 one row of three bays is shown. In FIG. 23, two rows and two columns are used, while in FIG. 24, three columns and three rows are used. The bays are open in the sense that there are no bottom walls below the support lattices in the normal situation and such bottom walls are not normally needed since the fuel modules are self-contained and supported solely by the support lattices. It will be clear that when only a small region or portion of the overall cooking area 22 is to be used, only one bay need to be used. Depending on the specific configuration of the support lattice on a given grill, this will determine the flexibility in shaping the area or that portion of the cooking or grilling area which is heated. As will be evident from FIGS. 22-24, the greater the number of bays within a given area, the greater the flexibility in selecting a desired heating configuration. Thus, in FIG. 22, only three relatively large bays are available and any one, two or all three of the bays can be used by placing appropriately dimensioned fuel modules in the bay or bays. In FIG. 24, however, it is possible to select more arbitrary shapes for the portion of the cooking or grilling area 22 which will be heated. Thus, an "L-shaped heating area is suggested by the shaded bays in FIG. 24. As a practical matter, however, the embodiments 12b and 12c in FIGS. 23 and 24, respectively, provide adequate flexibility. Providing more than, for example, 9 bays as shown in FIG. 24 necessitates the handling of too many fuel modules and, therefore, may become cumbersome and inconvenient.

Figure 19:
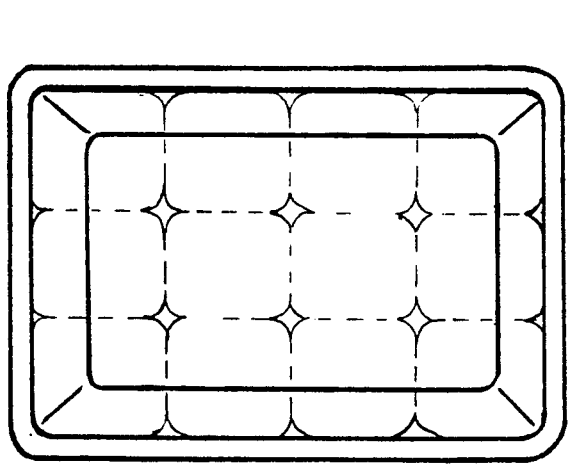
FIG. 19 is a bottom plan view of the food module as shown in FIG. 18.
Figure 20:
FIG. 20 is an end elevational view of the food module shown in FIG. 18.

The specific manner in which the fuel modules 12 are retained or supported within the bays is not critical for purposes of the present invention. Referring to FIGS. 19-21, the tray 86 includes a briquette receiving portion 86a and a peripheral rim or lip 86b. As best shown in FIGS. 2 and 3, the trays 86 are so dimensioned and configured so as to position the rims or lips 86b support members 14a–14f of the support lattice 14. Clearly, the specific configurations of the support lattice support members as well as the shape of the rim 86b is not critical as long as a mating relationship exists when the fuel module is deposited in a bay and the lattice structure supports the fuel module.

As noted, the preferred embodiment does not include a bottom wall below the support lattice 14 since no bottom wall is needed to capture dropping ashes. The tray 86 of the fuel module 12 itself serves as a bottom wall and contains all of the ashes as the briquettes are consumed. Because the fuel modules are intended to be used once and then disposed, any ashes left can be thrown out with the tray 86. This avoids the need to clean the bottom of the grill, since all of the fuel modules, together with any grease and the like which may have dropped into them are simply discarded. However, if a bottom wall is desired, for purposes of strengthening or stiffening the grill structure, such a bottom wall can be provided, as suggested by the dashed outlines in FIGS. 2 and 3.

The thicknesses of the fuel modules is a matter of design choice. Thus, in FIGS. 18 and 21, the thickness of the fuel module is selected to provide a single layer of charcoal briquettes 90. For most purposes, this is adequate. However, when poultry or other items need to be cooked for a long time, it may be desirable to use a thicker fuel module which contains two or three layers of charcoal briquettes.

While the grill of the present invention is primarily intended to be used with fuel modules 12, as aforementioned, the grill is preferably also provided with a flat plate 100 (FIG. 1) which is dimensioned to substantially correspond to the cooking or grilling area 22, so that when it is deposited onto the support lattice 14 it completely covers the support lattice. Such a support plate can be used to cover the bays 16 so that conventional loose charcoal briquettes can be poured onto the support plate 100 when fuel modules are either not available or conventional briquettes are to be used. In such a case, an appropriate grate (not shown) can also be used, as shown or disclosed in U.S. Pat. No. 5,105,726, the disclosure of which is incorporated in this application as if fully set forth herein.

Having described the present invention in detail, it is obvious that one skilled in the art will be able to make variations and modifications thereto without departing from the scope of the invention. Accordingly, the scope of the present invention should be determined only by the claims appended hereto.

I claim:

1. A grill adapted to be used with a plurality of fuel modules each comprising a disposable non-flammable tray having a heat source disposed therein and having a lip extending outwardly from said tray about the periphery thereof, said grill comprising:

a housing having a top, bottom and a pair of opposing sides;

means adjacent the top of the housing for supporting an article of food above the bottom of the housing;

support means adjacent the bottom of the housing, said support means comprising a lattice structure defining a plurality of openings extending through the bottom of the housing with each opening being bounded by a rim extending around the periphery thereof;

said openings of said lattice structure each being adapted to receive one of said fuel modules therein with the lip of each fuel module resting directly on the rim of a respective opening;

whereby any number of said fuel modules may be ignited to selectively apply heat to various portions of the food supporting means.

2. A grill as defined in claim 1, wherein all said openings are rectangular and equal in size.

3. A grill as defined in claim 2, wherein said openings are arranged along a single column.

4. A grill as defined in claim 2, wherein said openings are arranged along a plurality of rows and columns.

5. A grill as defined in claim 1, wherein said sides are hingedly connected to said lattice structure to enable said sides to fold into a collapsed condition wherein said sides are disposed in close proximity to said lattice structure when the grill is not in use.

6. A grill as defined in claim 1, further comprising a sheet of non-flammable material substantially the size of said lattice which can be positioned and supported on said lattice, whereby conventional briquettes can be used with the grill by depositing them on said sheet material when fuel modules are not used.

7. A grill as defined in claim 1, wherein said lattice is generally rectangular.

8. A grill as defined in claim 1, wherein said lattice comprises a plurality of mutually orthogonal support members that form said openings.

9. In combination, a grill and a plurality of fuel modules, comprising:

a plurality of fuel modules, each comprising a disposable non-flammable tray having a heat source disposed therein and having a lip extending outwardly from said tray about the periphery thereof;

a housing having a top, bottom and a pair of opposing sides;

means adjacent the top of the housing for supporting an article of food above the bottom of the housing;

support means adjacent the bottom of the housing, said support means comprising a lattice structure defining a plurality of openings extending through the bottom of the housing with each opening being bounded by a rim extending around the periphery thereof;

said openings of said lattice structure each being adapted to receive one of said fuel modules therein with the lip of each fuel module resting directly on the rim of a respective opening;

whereby any number of modules may be ignited to selectively apply heat to various portions of the food supporting means.

10. A grill as defined in claim 9, wherein said heat source comprises a plurality of charcoal briquettes within said tray, and a sheet of covering material for covering said tray and retaining said charcoal briquettes prior to use.

11. A grill as defined in claim 10, wherein said tray is made of aluminum and said covering comprises a sheet of flammable material.

12. A grill as defined in claim 10, further comprising briquette lighting means for facilitating the ignition of said charcoal briquettes.

13. A grill as defined in claim 12, wherein said briquette lighting means comprises at least one flammable wick in contact with at least some of said charcoal briquettes and having at least one free end extending outside said tray.

14. A grill as defined in claim 12, wherein said briquette lighting means comprises at least one cord impregnated with oil in contact with said at least some of said charcoal briquettes and having at least one free end extending and being accessible outside said tray.

* * * * *